United States Patent [19]

Frady

[11] Patent Number: 5,283,694
[45] Date of Patent: Feb. 1, 1994

[54] LINE PROJECTOR LENS

[76] Inventor: Richard A. Frady, 620 County Rd. #324, Moulton, Ala. 35650

[21] Appl. No.: 947,559

[22] Filed: Sep. 21, 1992

[51] Int. Cl.$^5$ .................................. G02B 27/44
[52] U.S. Cl. ................................................. 359/719
[58] Field of Search ............... 359/719, 718, 708, 710

[56] References Cited

U.S. PATENT DOCUMENTS

| 4,447,136 | 5/1984 | Kitamura | 359/719 |
| 4,589,738 | 5/1986 | Ozaki | 359/729 |
| 4,688,056 | 5/1987 | Braat et al. | 359/719 |
| 4,820,029 | 4/1989 | Iwai et al. | 359/719 |
| 4,826,299 | 5/1989 | Powell | 359/719 |
| 4,933,599 | 6/1990 | Fukuda | 359/708 |
| 4,961,622 | 10/1990 | Gorman et al. | 359/708 |
| 5,005,938 | 4/1991 | Itoh et al. | 359/708 |
| 5,087,115 | 2/1992 | Ishibai et al. | 359/719 |
| 5,164,584 | 11/1992 | Wike, Jr. et al. | 359/719 |
| 5,223,978 | 6/1993 | Burkhart et al. | 359/719 |

Primary Examiner—John T. Kwon
Attorney, Agent, or Firm—John C. Garvin, Jr.; Harold W. Hilton

[57] ABSTRACT

A line projector is described which uses a line projector lens for receiving light from a light source which outputs a beam having a non-circular configuration. The lens receives this non-circular beam as an input and redistributes the non-circular input in two directions as rays which form a line of uniform width and intensity along its length and also forms the line with well defined ends.

13 Claims, 2 Drawing Sheets

LINE PROJECTOR LENS

FIELD OF THE INVENTION

The present invention generally relates to optical elements (lenses) and particularly to a line projector lens having an anamorphic asphere surface. The lens redistributes a non-circular light input in two directions to form a line of uniform width and intensity with defined ends.

BACKGROUND OF THE INVENTION

Laser guidelines have been widely used in industry as visual references for cutting, folding, bending, etc. In its use as a guideline, the laser is required to draw a fine line of light on an object and this line is used as a guide by which cutting, folding, bending, etc. functions are achieved.

One such method employed in producing the guidelines is to rotate a polygonalprismatic mirror at a high speed in the path of a laser beam to make the reflected beam sweep the surface of an object. This method requires a plurality of parts assembled in a complicated structure for rotating the mirror.

Another alignment tool which has been resorted to is the combination of a He-Ne laser with a cylindrical lens attachment on the front for expanding the beam in one direction. However, it has been found that the laser beam varies significantly in intensity and width along its length.

U.S. Pat. No. 4,589,738, issued May 20, 1986 to Ozaki, sets forth various optical arrangements for projecting a laser beam in a linear pattern such as a line, square, etc. A convex reflector or a concave lens is used to spread a laser beam radically and a cylindrical-concave reflector is relied upon to converge the radially expanded beam linearly to project a line, square, etc. As can be understood from the foregoing description, and one drawback of this approach is that the arrangement is complex and requires a variety of optical elements in strict alignment. Another drawback is that the projected line is non-uniform in width and intensity along its length, as was discussed above in conjunction with the cylindrical lens.

A linear diverging lens is disclosed in U.S. Pat. No. 4,826,299 issued to Ian Powell on May 2, 1989. The lens is a two surface optical element with a relatively sharp radius at its apex and whose primary surface can be closely described by a one surface conical. The lens of the Powell patent, typically, is used in conjunction with a He-Ne laser beam which has an output beam having a circular configuration, and the Powell lens expands this circular beam in one direction to produce a reference line.

A major defect found in the lens of the Powell patent is that it is limited to use with the circular output of a He-Ne laser when being used as a line projector lens and cannot be used to properly function as a line projector lens when used with a laser having an output beam configuration which is non-circular such as an elliptical output beam configuration of a solid state laser diode.

However, it has been found that by using a laser diode in combination with a properly designed lens that a compact line projector device could be produced which would be simple in construction, and inexpensive. Structure of the present invention provides such line projector lens.

It is, therefore, an object of the present invention to provide a lens which will function as a line projector lens when used with a light source having other than a circular output beam configuration.

It is another object of the present invention to provide such a lens which has an anamorphic aspheric line projector surface.

It is still a further object of the present invention to provide such a lens which will function to expand an elliptical beam in one direction while compressing it in another direction to form a line of uniform width and intensity with defined ends.

These and other objects of the present invention will become more readily apparent when taken in conjunction with the accompanying drawings, specifications and claims.

DESCRIPTION OF THE PREFERRED EMBODIMENTS

The line projector lens of the present invention is disposed for receiving a beam of light from a source which outputs a light beam having a non-circular configuration, such as a laser diode. As noted above, the patent to Powell (U.S. Pat. No. 4,826,299) was designed to expand a circular beam of light, which is characteristic of a HeNe laser, in a single direction to form a line. However, such a lens has been found to be very inefficient when used with a light source having an elliptical configuration, for example. Laser diodes have elliptically configured outputs. Typically, such lens as proposed in U.S. Pat. No. 4,826,299 produces a line with non-uniform width and tear drop shaped bright ends when used with a non-circular light input.

The anamorphic asphere lens surface of the present invention is disposed for redistributing a non-circular light input in two directions and can be described by the following equation:

$$Z = \frac{CUX\,X^2 = CUY\,Y^2}{1 + \sqrt{1 - (1 + KX)\,CUX^2\,X^2 - (1 + KY)\,CUY^2\,Y^2} \;+\; AR \cdot \{(1 - AP) \cdot X^2 + (1 + AP) \cdot Y^2\}^2 \;+\; BR \cdot \{(1 - AP) \cdot X^2 + (1 + BP) \cdot Y^2\}^3 \;+\; CR\,\{(1 - CP)\,X^2 + (1 + CP)\,Y^2\}^4 \;+\; DR\,\{(1 - DP)\,X^2 + (1 + DP)\,Y^2\}^5}$$

In this equation,

| | |
|---|---|
| Z | is the sag of the surface parallel to the Z axis. |
| CUX, CUY | are the curvatures in X and Y, respectively. |
| KX, KY | are the conic constants in X and Y, respectively, and correspond to eccentricity. |
| AR, BR, CR, DR | are the rotationally symmetric portions of the 4th, 6th, 8th, and 10th order deformations from the conic. |
| AP, BP, CP, DP | Represent the non-rotationally symmetric portion of the 4th, 6th, 8th and 10th order deformation from the conic. |

Such anamorphic asphere surfaces is discussed specifically on pages 2A-218 and 2A-219 of Code V Reference Manual, Version 7.50 dated April 1992 and published by Optical Research Associates, Pasadena, Calif.

Figure 1:
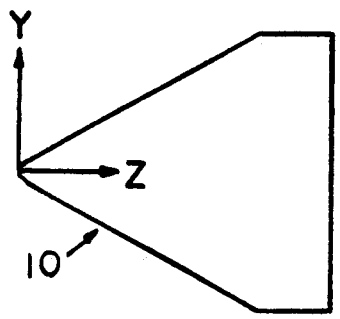
FIG. 1 illustrates the lens of the present invention having cartesian coordinates (Y, Z) placed thereon. The X coordinate is perpendicular to the plane of the paper.

FIG. 1 is a view illustrating the lens 10 of one embodiment of the present invention having Y,Z cartesian coordinates positioned thereon. The X plane is normal to the plane of the paper.

Figure 2:
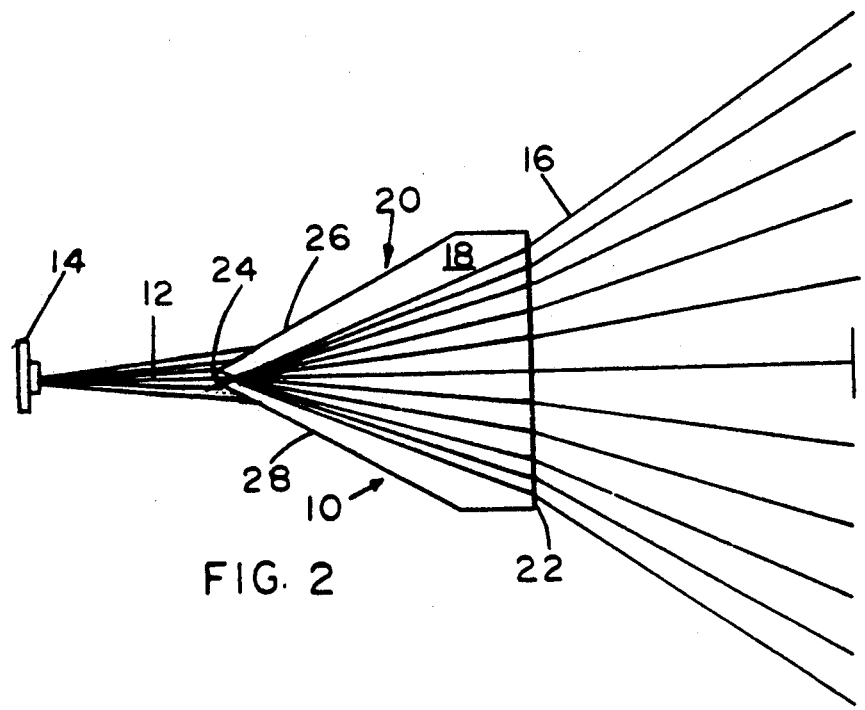
FIG. 2 is a view similar to FIG. 1 of a lens of the present invention. A light source is shown illuminating the lens and rays are illustrated being emanated from the lens.
Figure 3:
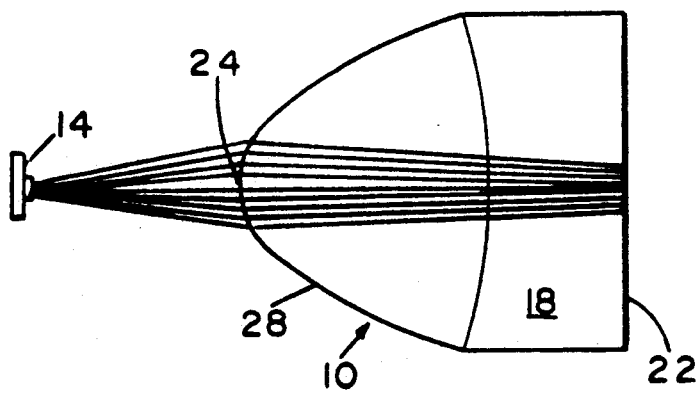
FIG. 3 is a side elevational view (XZ planes) of the lens of FIG. 1 illustrating the curved configuration of the apex.

FIGS. 2 and 3 show a lens 10 according to the present invention wherein the lens 10 is irradiated by a laser beam 12 from a laser diode 14. The beam is redistributed by the lens to form rays 16 which form a line having a uniform width and intensity with defined ends. As can be further seen in FIGS. 2 and 3, lens 10 includes a body 18 having a primary surface 20 and a secondary surface 22. The primary surface includes a substantially curved apex 24 formed by converging side surfaces 26 and 28. The lens is oriented relative to the diode with the elongated axis of the elliptically configured diode output perpendicular to the projected line.

FIG. 3 is a side view (in the XZ plane) of the lens of FIG. 1 and illustrates the curved surface of the apex. No focusing lens is used with the line generating lens shown in FIGS. 2 and 3.

Figure 4:
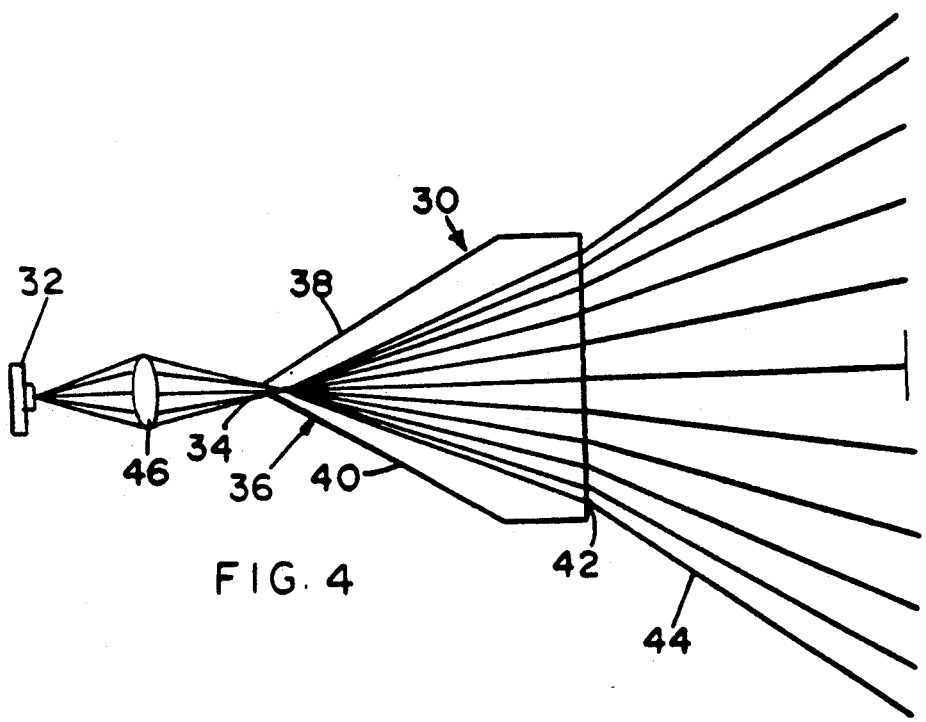
FIG. 4 is a view similar to FIG. 2 but having a focusing lens positioned between the line generating lens and the light source.

FIG. 4 illustrates an optical arrangement wherein a lens 30 is illuminated by a diode 32 which directs its non-circular beam through the apex 34 of the primary surface 36 of lens 30. The apex is elongated in the X plane (FIG. 5) and is formed by converging sides 38 and 40. A secondary surface 42 is disposed in spaced relation from the apex. The laser beam from diode 32 is directed into lens 30 and redistributed thereby to form rays 44 which are configured as a line which is uniform in width and intensity with defined ends. A focusing lens 46 is positioned between the lens 30 and the laser diode 32.

Figure 5:
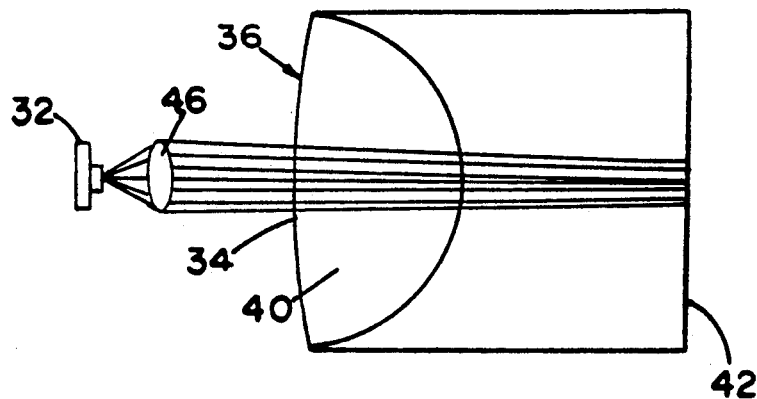
FIG. 5 is a side view (XZ planes) of the lens of FIG. 3 illustrating the reduced curvature of the apex when a focusing lens reduces the light source divergence.

FIG. 5 is a side view (in the XZ plane) of the lens of FIG. 4 and illustrates the elongated configuration of apex 34. The apex is shown to have a very slightly curved surface.

It is to be understood that the present invention may be configured using a focusing or imaging lens to reduce the divergence of the light source. Furthermore, it is understood that the present invention would work equally well without a focusing or imaging lens. In the following specific lens description, both configurations are listed.

LENS DESCRIPTION

Convex without focusing lens. 70% of energy into 25.2 inch line at a distance of 18 inches.
CUY=9.17515
KY=−0.984590
AR=−0.189001E+01
BR=−0.119311E+03
CR=0.107021E+03
CUX=0.44976
KX=0.087092
AP=0.105640E+01
BP=0.901127E+00
CP=0.955257E+00
DP=0.100090E+01

Convex with focusing lens. 70% of energy into 25.2 inch line at a distance of 18 inches.
CUY=9.842520
KY=−0.994928
AR=−0.199138E+01
BR=−0.185838E+02
CR=0.198689E=03
DR=−0.802233E+03
CUX=−0.115301E−02
KX=−6.657130E+04
AP=0.100588E+01
BP=0.100470E+01
CP=0.989501E+00
DP=0.992001E+00

All lenses set forth above are designed out of Schott BK7, have a center thickness of 9 mm, and are oriented with the flat side of the lens facing the projected line. The laser diode is 5 mm away. The projected line is 18 inches from the flat surface of the line projectors. The projected line is perpendicular to the orientation of the largest divergence angle of the laser diode. The line projector lens with the focusing lens are 4 mm from the focusing lens' surface. The design laser diode is the Toshiba TOLD9220 with a far field pattern aspect ration of 5.

It is to be also understood that although the secondary surface discussed above is shown to be flat, other configurations such as negatively cylindrical or negatively spherical may be resorted to, if desired. Furthermore, the primary surface may also be concave.

Figure 6:
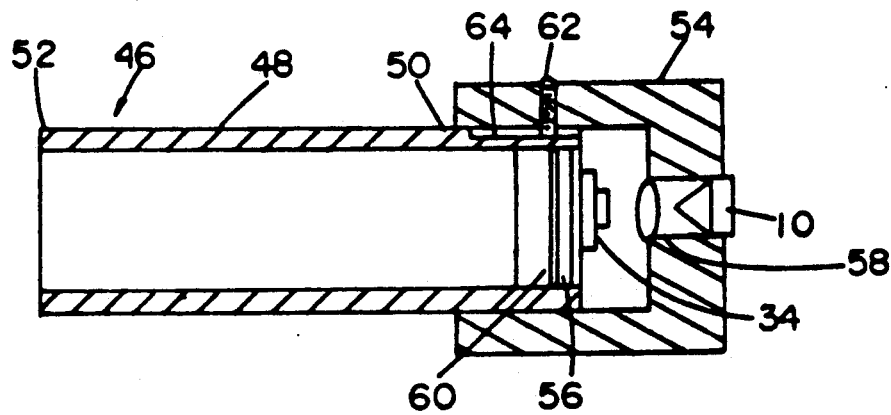
FIG. 6 is a cross-sectional view of a support and focusing housing having the lens of the present invention thereon.

FIG. 6 illustrates the line projector lens (shown in FIGS. 4 and 5) in a line projector device 46. The device 46 is shown to include a housing 48 having a forward end 50 and a rear end 52. An adjustable front cover member 54 is movably mounted on forward end 50 and has the lens 10 of the present invention mounted therein. Laser diode 32 is mounted at the forward end 50 of housing 48 and a thermoelectric cooler 56 is mounted adjacent the laser diode 32 to keep the diode cool during operation of the device. A base 60 which may be made of heat sink material is mounted adjacent cooler 56. A set screw 62 (or screws) is provided for engaged relation in a slot 64 for the adjustable movement. A focusing lens 58 to increase the depth of field may be mounted in the movable section 54, if desired. An additional lens may be placed adjacent to the secondary surface of the lens 10 to increase the depth of field, if desired.

The thermoelectric cooling device may be similar to that manufactured by Materials Electronic Product Corp. (MELCOR) of Trenton, N.J., having part number FC 0.45-32-0SL.

I claim:
1. An optical lens disposed for cooperation with a light source having a non-circular output to redistribute said output in two directions and transform said non-circular output into a line of uniform width and intensity with defined ends, comprising:
a body having a primary surface and a secondary surface, said primary surface defined by a pair of side surfaces which converge to form an apex defining an anamorphic asphere surface, said apex disposed in spaced relation with said secondary surface, and, said anamorphic asphere surface defined by the following equation:

$$Z = \frac{CUX \, X^2 = CUY \, Y^2}{1 + \sqrt{1 - (1 + KX) \, CUX^2 \, X^2 - (1 + KY) \, CUY^2 \, Y^2}} +$$
$$AR \cdot \{(1 - AP) \cdot X^2 + (1 + AP) \cdot Y^2\}^2 +$$
$$BR \cdot \{(1 - AP) \cdot X^2 + (1 + BP) \cdot Y^2\}^3 +$$
$$CR \cdot \{(1 - CP) \cdot X^2 + (1 + CP) \cdot Y^2\}^4 +$$
$$DR \cdot \{(1 - DP) \cdot X^2 + (1 + DP) \cdot Y^2\}^5$$

where,

| | |
|---|---|
| Z | is the sag of the surface parallel to the Z axis. |
| CUX, CUY | are the curvatures in X and Y, respectively. |
| KX, KY | are the conic constants in X and Y, respectively, and correspond to eccentricity. |
| AR, BR, CR, DR | are the rotationally symmetric portions of the 4th, 6th, 8th, and 10th order deformations from the conic. |
| AP, BP, CP, DP | Represent the non-rotationally symmetric portion of the 4th, 6th, 8th and 10th order deformation from the conic. |

2. The optical lens as set forth in claim 1 wherein said light source is a laser diode.

3. The optical lens as set forth in claim 2 wherein
CUY=9.17515
KY=−0.984590
AR=−0.189001E+01
BR=−0.119311E+02
CR=0.107021E+03
CUX=0.44976
KX=0.087092
AP=0.105640E+01
BP=0.901127E+00
CP=0.955257E+00
DP=0.100090E+01

4. The optical lens as set forth in claim 2 including a first focusing lens disposed between said light source and said apex of said body and wherein:
CUY=9.842520
KY=−0.994928
AR=−0.199138E+01
BR=−0.185838E+02
CR=0.198689E+03
DR=−0.802233E+03
CUX=−0.115301E−02
KX=−6.657130E+04
AP=0.100588E+01
BP=0.100470E+01
CP=0.989501E+00
DP=0.992001E+00

5. A line projector including a line projector lens for receiving a non-circular beam of light from a light source as an input and for redistributing said non-circular input in two directions as rays which form a single line which is uniform in width and intensity with well defined ends;
a body forming said lens, said body having a primary surface formed by a pair of side surfaces which converge to form an apex, said body having a secondary surface in spaced relation with said apex, said primary surface disposed for transforming said non-circular laser beam into a line which is uniform in width and intensity with defined ends; and support means for support of said lens,
wherein said primary surface is in an anamorphic asphere surface, wherein said anamorphic asphere surface is defined by the following equation:

$$Z = \frac{CUX \, X^2 = CUY \, Y^2}{1 + \sqrt{1 - (1 + KX) \, CUX^2 \, X^2 - (1 + KY) \, CUY^2 \, Y^2}} +$$
$$AR \cdot \{(1 - AP) \cdot X^2 + (1 + AP) \cdot Y^2\}^2 +$$
$$BR \cdot \{(1 - AP) \cdot X^2 + (1 + BP) \cdot Y^2\}^3 +$$
$$CR \cdot \{(1 - CP) \cdot X^2 + (1 + CP) \cdot Y^2\}^4 +$$
$$DR \cdot \{(1 - DP) \cdot X^2 + (1 + DP) \cdot Y^2\}^5$$

where,

| | |
|---|---|
| Z | is the sag of the surface parallel to the Z axis. |
| CUX, CUY | are the curvatures in X and Y, respectively. |
| KX, KY | are the conic constants in X and Y, respectively, and correspond to eccentricity. |
| AR, BR, CR, DR | are the rotationally symmetric portions of the 4th, 6th, 8th, and 10th order deformations from the conic. |
| AP, BP, CP, DP | Represent the non-rotationally symmetric portion of the 4th, 6th, 8th and 10th order deformation from the conic. |

6. A line projector as set forth in claim 5 wherein said light source is a laser diode.

7. A line projector lens as set forth in claim 6 wherein said support means is a housing having a rear section and a non-rotatable forward adjustable section, said lens being rigidly secured in said forward section of said housing.

8. A line projector as set forth in claim 7 including coolant means disposed adjacent said laser diode to cool said laser diode.

9. A line projector as set forth in claim 8 wherein said coolant means is a thermoelectric cooler.

10. A line projector lens as set forth in claim 9 including a focusing lens disposed between said laser diode and said line projector lens.

11. A line projector lens as set forth in claim 10 wherein:
CUY=9.842520
KY=−0.994928
AR=−0.199138E+01
BR=−0.185838E+02
CR=0.198689E+03
DR=−0.802233E+03
CUX=−0.115301E−02
KX=−6.657130E+04
AP=0.100588E+01
BP=0.100470E+01
CP=0.989501E+00
DP=0.992001E+00

12. A lens as set forth in claim 9 wherein:
CUY=9.17515
KY=−0.984590
AR=−0.189001E+01
BR=−0.119311E+03
CR=0.107021E+03
DR=−0.331494+03
CUX=0.44976
KX=0.087092
AP=0.105640E+01
BP=0.901127E+00
CP=0.955257E+00
DP=0.100090E+01

13. A line projector as set forth in claim 9 wherein said forward section of said housing is provided with an outer surface having a longitudinal slot thereon, and said forward adjustable section is provided with an opening therein, and, fastener means disposed in said opening for engaged relation with said forward section of said housing in said slot to secure said forward adjustable section to said housing.

* * * * *